June 3, 1930.  E. R. GREER  1,761,723
SPRINKLING APPARATUS
Filed Dec. 7, 1925
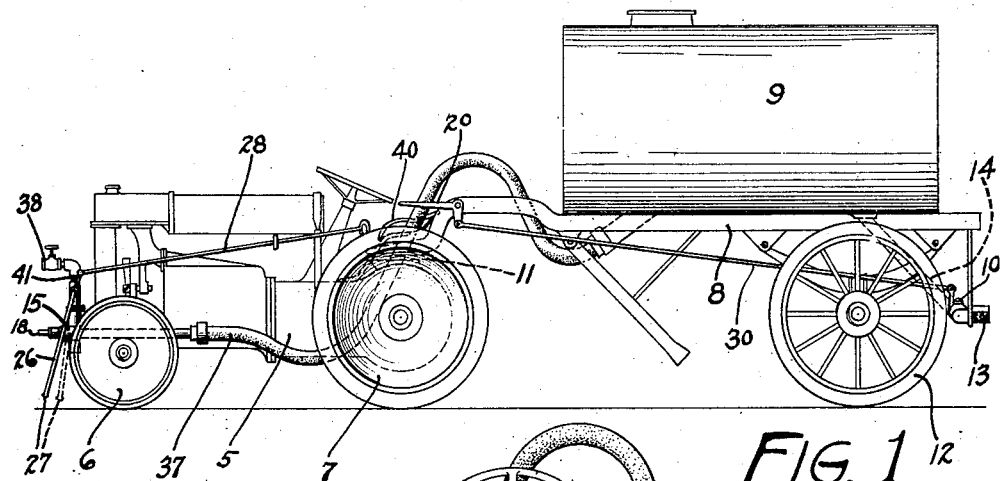
FIG. 1
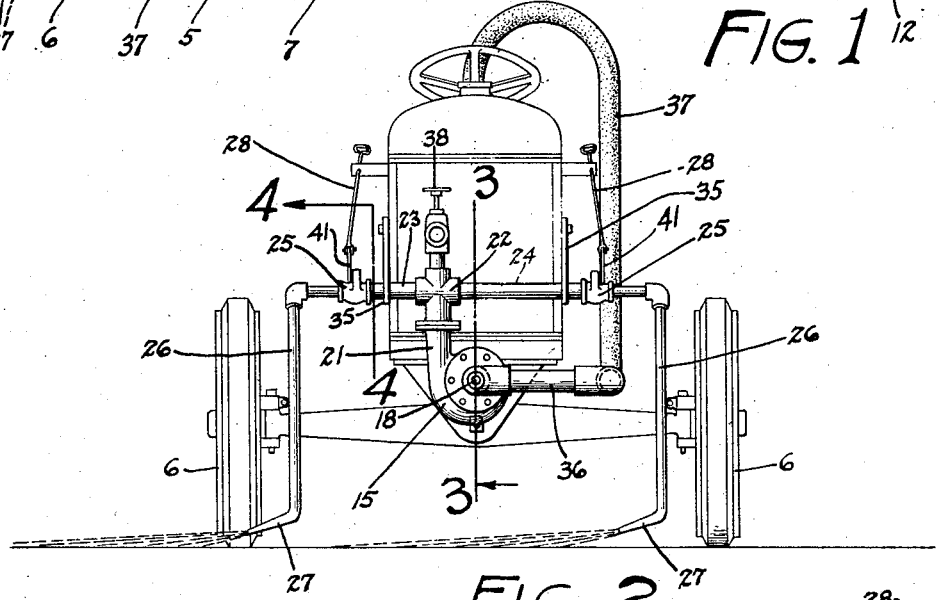
FIG. 2
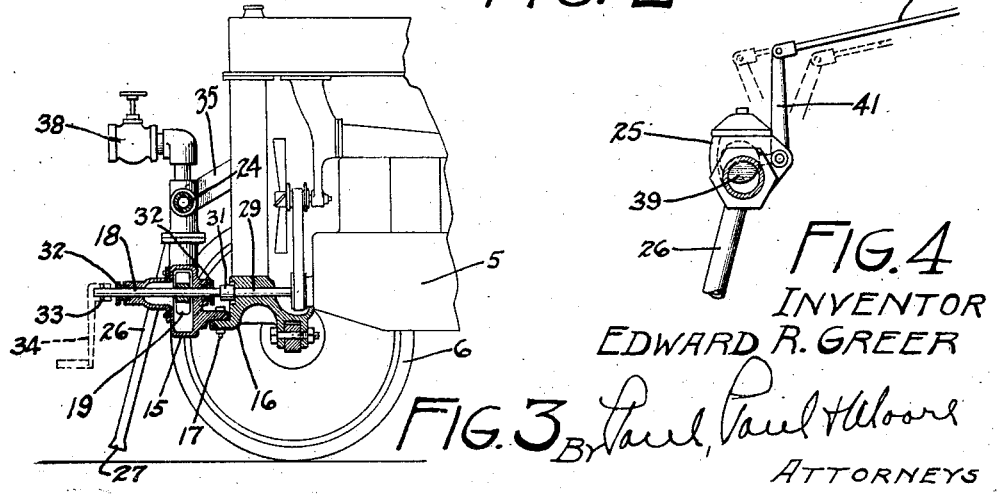
FIG. 3
FIG. 4
INVENTOR
EDWARD R. GREER
By Paul, Paul H Moore
ATTORNEYS Patented June 3, 1930

1,761,723

UNITED STATES PATENT OFFICE

EDWARD R. GREER, OF MINNEAPOLIS, MINNESOTA

SPRINKLING APPARATUS

Application filed December 7, 1925. Serial No. 73,845.

This invention relates to an improved sprinkling apparatus particularly adapted for use in sprinkling streets and roadways, and more particularly relates to such an apparatus comprising a tractor having a pump mounted at the forward end thereof from which the water may be pumped through a pair of nozzles onto the surface of the street or roadway for flushing purposes, the water being supplied to the pump from a trailer connected to the rear end of the tractor.

An object of the invention is to provide a sprinkling apparatus including a tractor, of ordinary construction, upon the forward end of which is mounted a water pump operated directly from the crank shaft of the tractor engine to deliver the water under pressure to the discharge nozzles provided with suitable valves for controlling the flow of water therethrough.

The partciular object of the invention, therefore, is to provide an improved sprinkling apparatus which may be used either for flushing or cleaning paved streets or for sprinkling road surfaces.

Other objects of the invention will appear from the following descriptions and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the accompanying drawings forming part of the specification,

Figure 1 is a view in side elevation of the improved sprinkling and flushing apparatus;

Figure 2 is a front view of Figure 1;

Figure 3 is a detail sectional view on the line 3—3 of Figure 2 showing how the pump may be mounted upon the forward end of a tractor; and Figure 4 is an enlarged detail sectional view on the line 4—4 of Figure 2 showing a form of valve which may be used to control the flow of water from the pump to the discharge nozzles.

In the selected embodiment of the invention here shown, for purposes of disclosure, there is illustrated a tractor of ordinary construction, comprising the engine frame 5 carried by the usual wheels 6 and 7. A trailer 8 having a tank 9 mounted thereon, is connected to the tractor by means of a suitable coupling 11. The rear end of the trailer is supported upon the usual wheels 12 at the rear of which the usual sprinkling heads 13 are mounted, each having a connection with the tank through pipe connections 14. Suitable valves 10 are interposed in the connections 14 to control the gravitational flow of the water therethrough. These valves may be acuated by the operator of the tractor by means of hand levers 20 connected to the valves 10 by rods 30.

A feature of this invention resides in the mounting of the pumping mechanism at the forward end of the tractor and its connection with the tank 9 on the trailer. As shown in Figures 1, 2 and 3, a centrifugal pump 15, of ordinary construction, is mounted upon a bracket 16 provided at the forward end of the tractor and is secured thereto by such means as the bolts 17. A shaft 18 is mounted in the pump casing and has a bladed wheel 19 mounted thereon adapted to force the water by centrifugal action from the pump through the discharge pipe 21 into a distributing head 22 having pipe connections 23 and 24 leading therefrom to a pair of valves 25, as shown particularly in Figure 2. Depending pipe sections 26 are connected to the valves 25 in such a manner that their positions may be relatively adjusted with respect to the tractor, as indicated by the dotted lines in Figure 1. Discharge nozzles 27 are terminally provided upon the depending pipe sections 26 to direct the water against the surface of the pavement as shown in Figure 2. Each valve 25 is provided with a suitable control rod 28 extending rearwardly to a convenient point adjacent the driver's seat 40 so that the opening and closing of the valves may be conveniently effected by the operator of the tractor while driving along the roadway.

The shaft 18 of the pump is preferably directly connected to the crank shaft 29 of the tractor engine by a suitable coupling 31 as shown in Figure 3. Suitable packing boxes 32 are provided on each side of the pump casing to prevent leakage of water around the pump shaft. A pin 33 is preferably secured to the end of the pump shaft 18 to receive the crank 34 by means of which engines of this type are usually started (see dotted lines in Figure 3). Suitable braces 35 connect the horizontal pipe sections 23 and 24 with the forward portion of the tractor. Thus it will be noted that by securing the pump casing to the bracket 16 of the tractor and also bracing the pipe sections 23 and 24 thereto, the pump mechanism will be securely held in place on the tractor without danger of accidentally becoming disarranged when driving over rough surfaces.

Water is preferably supplied to the pump through the intake pipe 36 having one end connected to the pump casing and its other end to a flexible connection 37 leading therefrom to the tank 9 of the trailer as shown in Figure 1. A valve 38 is also connected to the distributing head 22 to provide means for connecting a hose to the pump, should it be desired to pump the water to a remote point or in case of a fire emergency. Figure 4 illustrates a form of valve which may be practically used to control the flow of water from the pump to the discharge nozzle 27. As shown it is of the gate type, comprising a gate 39 operable by means of an arm 41 to which the rod 28 is connected.

In the operation of this novel sprinkling and street flushing apparatus the pump 15 will be started simultaneously with the starting of the tractor as a result of its direct connection with the crank shaft thereof. When the valves 25 are closed to the passage of water therethrough, the bladed wheel 19 in the pump will merely rotate in the water contained in the pump casing without any pumping effect. As soon, however, as one or both of the valves 25 are open, the water will be forced from the pump casing through the valves into the depending pipe sections 26 and through the nozzles 27. By means of the valves 25, the amount of water delivered to the street surface through the nozzles 27 may be regulated, as desired. The depending pipe sections 26 are also mounted in such a manner that they may be adjusted with relation to the tractor, and the nozzle may also be adjustably connected to the pipe sections 26 so that the water discharging therefrom may be directed against the street surface at any desired angle.

The construction of this novel sprinkling apparatus is very simple and inexpensive as practically all parts used in the construction thereof may be standard. Also by directly connecting the pump shaft to the engine crank shaft as shown and above described, no additional operating mechanism is required to control the operation of the pump, as the flow of water therefrom may be controlled entirely by the opening and closing of valves 25. It it well known in pumps of the centrifugal type, such as the one here shown, that when the flow or velocity of the water therethrough is interrupted, the bladed wheel 19 will merely rotate or turn in the water without offering any appreciable resistance or load to the operation of the engine crank shaft to which it is directly connected. The tractor may also be used for other purposes by disconnecting the trailer therefrom and removing the flexible connection 37, thereby providing an apparatus well adapted for use for road or street maintenance work, as it may be used either for flushing or sprinkling, or for hauling loads or other road maintenance machinery. By means of the control rods 28 and the hand levers 20, the operation of sprinkling and flushing may be conveniently controlled from the operator's seat on the tractor.

Having thus described my invention, what I claim as new and desire to obtain by Letters Patent, is

1. An apparatus of the class described, comprising in combination, a tractor having a semi-trailer connected thereto, a tank on the trailer, a pump secured to the tractor at the forward end thereof and having its shaft coupled directly to the tractor engine crank shaft, a flexible connection between the pump and tank, a distributing head mounted on the pump casing and connected to the discharge of the pump, pipe connections oppositely extending from said head and having nozzles terminally provided thereon for directing the water against the surface of a pavement, control valves in said pipe connections, and a valved discharge opening in said head having means for attaching a hose thereto whereby the water may be directed to a remote point as when used to extinguish a fire.

2. An apparatus of the class described, comprising in combination, a tractor having a trailer connected thereto, a tank on the trailer, a pump mounted at the forward end of the tractor and having its shaft coupled directly to the tractor engine crank shaft for simultaneous operation therewith, a flexible connection between the pump and tank, a distributing head mounted on the pump casing and connected to the discharge of the pump, pipe connections extending from said head and having nozzles terminally thereon for directing the water against the surface of a pavement, and control valves in said pipe connections.

In witness whereof, I have hereunto set my hand this 19th day of November, 1925.

EDWARD R. GREER.